Nov. 1, 1932.  L. R. WILLIAMSON  1,885,500
LUBRICATING SYSTEM
Filed Feb. 21, 1931
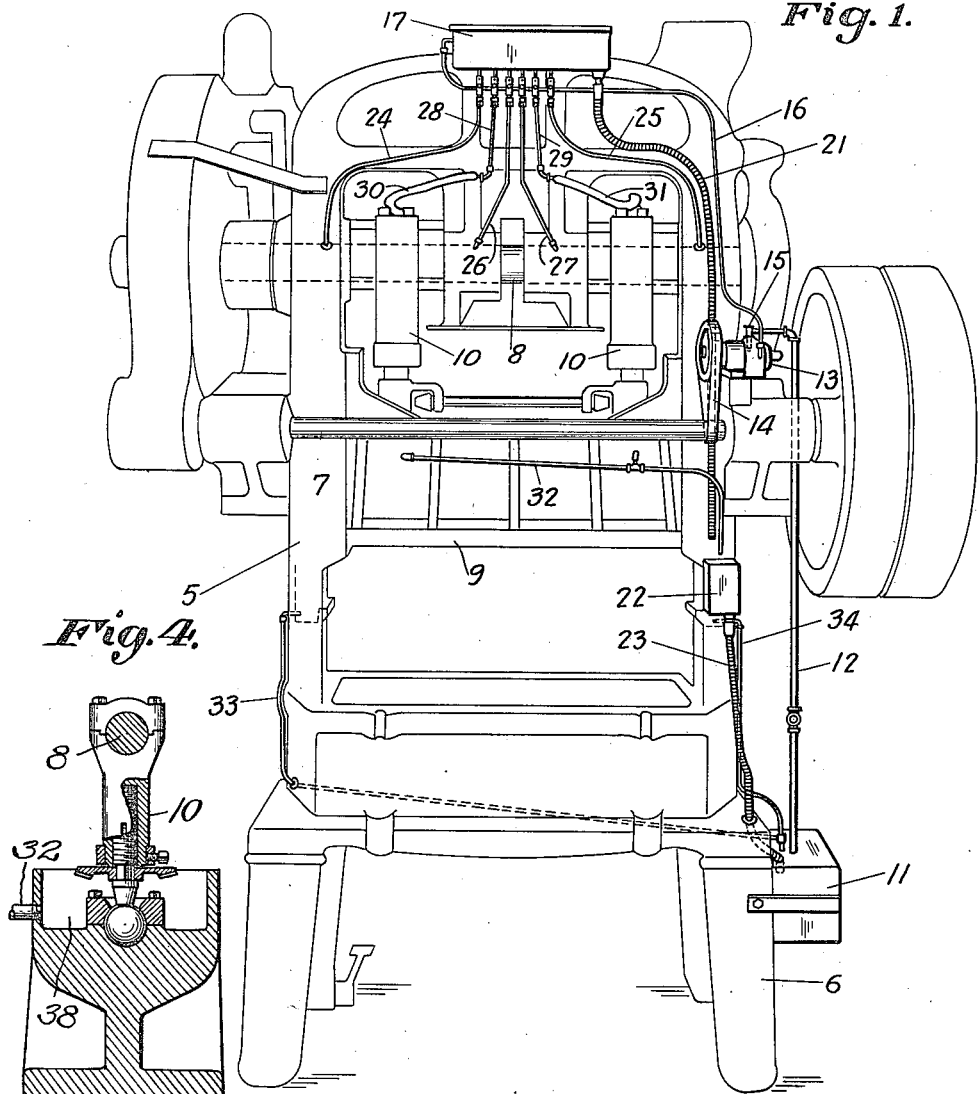
Fig. 1.
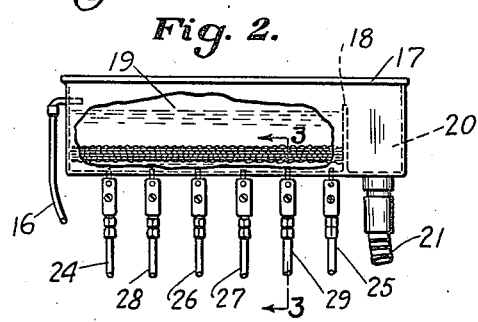
Fig. 4.
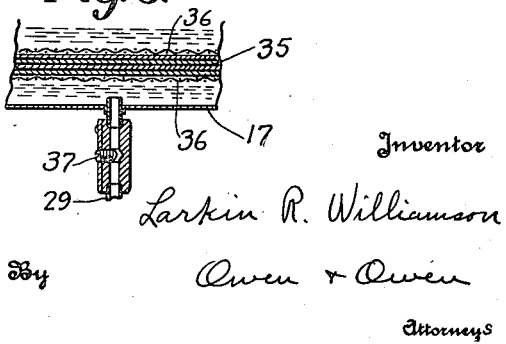
Fig. 2.
Fig. 3.
Inventor
Larkin R. Williamson
By Owen & Owen
Attorneys Patented Nov. 1, 1932

1,885,500

UNITED STATES PATENT OFFICE

LARKIN R. WILLIAMSON, OF TOLEDO, OHIO, ASSIGNOR TO THE TOLEDO MACHINE AND TOOL COMPANY, OF TOLEDO, OHIO, A CORPORATION OF OHIO

LUBRICATING SYSTEM

Application filed February 21, 1931. Serial No. 517,430.

This invention relates to a lubricating system which is particularly adapted for use in connection with a power press or similar machine.

Various lubricating systems heretofore used on machines of this type have been dependent for their operation upon the more or less frequent attention of the operator, but it is the object of the present invention to provide a system which is entirely automatic, and particularly one in which, during the operation of the machine, there is a continuous cyclic flow of lubricant to and from the various surfaces to be lubricated.

The invention will be specifically explained in connection with the accompanying drawing, in which—

Figure 1 is a perspective view of the system as applied to a power press, the latter being shown in light lines;

Figure 2 is an enlarged front elevation, with parts broken away, of the constant level reservoir from which lubricant is supplied to the various parts of the machine; and Figure 3 is a detail sectional view, on a larger scale, taken on the line 3—3 of Figure 2.

Fig. 4 is a transverse section through the slide and the adjacent end of the member which connects it to a crankshaft.

As illustrated in the drawing, the invention is applied to the lubrication of a power press which comprises a frame 5 mounted on a base 6, a drive shaft 7, a crank shaft 8 and a slide 9 connected to the crank shaft by connecting members 10. The main supply of lubricant is contained in a tank 11 secured to some convenient part of the frame or base 6, as shown in Figure 1. A conduit 12 leads from a point below the surface of the liquid in the tank 11 to a pump 13 which may be driven from some part of the machine by a suitable driving connection 14. This conduit may be provided above the pump with an inlet 15 for the purpose of priming the pump. The pump forces the lubricant through a tube 16 to a distributing reservoir 17 which should be located near the top of the machine.

The reservoir 17 is divided by a partition 18 into a constant level chamber 19 beneath the end of the tube 16 and an overflow chamber 20 from which an overflow pipe 21 leads downwardly. For convenience in collecting the return flow of oil a basin 22 may be located at some point on the frame to catch the overflow from the pipe 21 and return it through the pipe 23 to the tank 11.

Various distributing tubes as illustrated at 24, 25, 26, 27, 28 and 29 lead from the bottom of the reservoir 17 to various parts of the machine. For example, tubes 24 and 25 are illustrated as leading to the outer crank shaft bearings and tubes 26 and 27 to the inner crank shaft bearings. The tubes 28 and 29 are shown as leading into flexible hose 30 and 31 which lead to the bearings for the connections 10. The upper face of the slide 9 is formed with a trough 38 to collect all lubricant which drips from the bearings above the same and provision is made for running this lubricant through a tube 32 to the basin 22 above described. The lubricant from the outer crank shaft bearings runs down the slide guideways into troughs formed at the bottoms thereof and is discharged thence through tubes 33 and 34 which also lead back to the tank 11.

The reservoir 17 preferably contains an oil filter which is indicated as composed of layers of felt 35 between sheets of wire gauze 36. This filter should be supported sufficiently above the bottom of the reservoir to permit free flow of the filtered oil to the various distributing tubes.

Inasmuch as some parts of the machine require more lubricant than others, and in order to adjust the amount of oil supplied to each part, each of the distributing tubes is provided with an adjustable inlet which in the present instance is shown as controlled by a screw 37.

From the foregoing description, it will be seen that I have provided a lubricating system in which the oil circulates continuously as long as the drive shaft is turning. It requires no attention on the part of the operator and the adjusting screws or valves 37 may be set so that the proper amount of oil will be supplied to each moving part.

While I have shown and described in detail one embodiment of the invention, it will be understood that the arrangement of the same may be modified considerably and that it may be adapted for use with various other machines without departing materially from the essential features of the construction as claimed.

What I claim is:

1. The combination with a power press comprising a drive shaft, a crank shaft, a slide, and connections between the crank shaft and slide, of a reservoir for lubricant, means for causing the lubricant to flow by gravity to the crank shaft and connection bearings, said slide being formed with a trough in its upper face for collecting the lubricant as it drains from the connection bearings, and means for returning the lubricant to said reservoir.

2. The combination with a power press comprising a drive shaft, a crank shaft, a slide, connections between the crank shaft and slide, and slideways in which the slide is guided, of a reservoir for lubricant, means for causing said lubricant to flow by gravity to the crank shaft and connection bearings and to the slideways, a supply tank, means for transferring lubricant from said supply tank to said reservoir and maintaining the lubricant at a constant level in said reservoir, said slide being formed with a trough in its upper face and the slideways being formed with troughs at their lower ends to collect the flowing lubricant as it drains from the lubricated surface, and means for returning lubricant from said troughs to the supply tank.

3. The combination with a power press comprising a drive shaft, a crank shaft, a slide, and connections between the crank shaft and slide, of a reservoir for lubricant, means for causing the lubricant to flow by gravity in separate streams to the crank shaft and connection bearings, means for individually regulating the flow of each of said streams, said slide being formed with a trough in its upper face for collecting the lubricant as it drains from the connection bearings, and means for returning the lubricant to said reservoir.

4. The combination with a power press comprising a drive shaft, a crank shaft, a slide, connections between the crank shaft and slide, and slideways in which the slide is guided, of a reservoir for lubricant, means for causing said lubricant to flow by gravity in separate streams to the crank shaft and connection bearings and to the slideways, means for individually regulating the rate of flow of each of said streams, a supply tank, means for transferring lubricant from said supply tank to said reservoir and maintaining the lubricant at a constant level in said reservoir, said slide being formed with a trough in its upper face and the slideways being formed with troughs at their lower ends to collect the flowing lubricant as it drains from the lubricated surface, and means for returning lubricant from said troughs to the supply tank.

In testimony whereof I have hereunto signed my name to this specification.

LARKIN R. WILLIAMSON.